United States Patent [19]
Lynn

[11] Patent Number: 6,016,888
[45] Date of Patent: Jan. 25, 2000

[54] STABLE FLOW ENHANCEMENTS FOR GROUND RUNUP ENCLOSURE

[76] Inventor: Christopher Lynn, 621 Quail Run Rd., Aptos, Calif. 95003

[21] Appl. No.: 08/963,214

[22] Filed: Nov. 3, 1997

[51] Int. Cl.[7] .................................................. B64F 1/26
[52] U.S. Cl. .......................................... 181/218; 181/210
[58] Field of Search ..................... 181/210, 217, 181/218, 220, 203, 204

[56] References Cited

U.S. PATENT DOCUMENTS

| | | | |
|---|---|---|---|
| 2,726,830 | 12/1955 | Brown et al. | 181/218 |
| 2,826,382 | 3/1958 | Hayden | 181/218 |
| 3,630,313 | 12/1971 | Smith | 181/218 |
| 4,958,700 | 9/1990 | Schafhaupt | 181/218 |

*Primary Examiner*—Khanh Dang
*Attorney, Agent, or Firm*—William W. Burns, Esq.

[57] ABSTRACT

Enchancements to the side walls of a ground runup (jet aircraft engine testing) facility, the enhancements comprising horizontal vents in the side walls, rolled or semicylindrical tops of the side walls and sloped front ends to the side walls, the combination of the enhancements providing stable air flow to engines even in unstable air conditions.

6 Claims, 8 Drawing Sheets

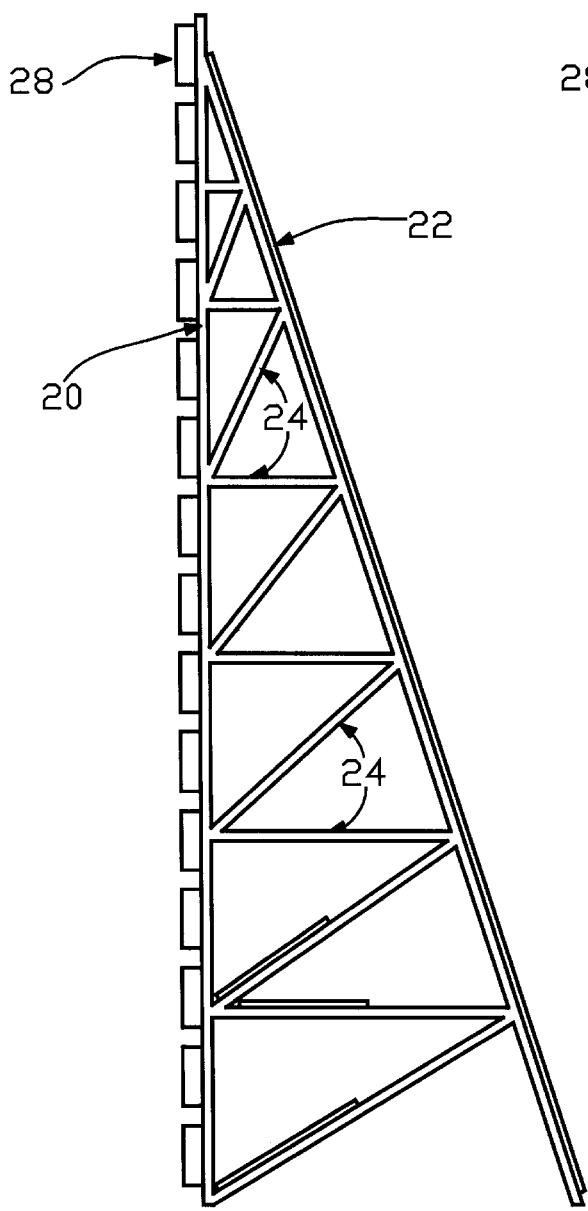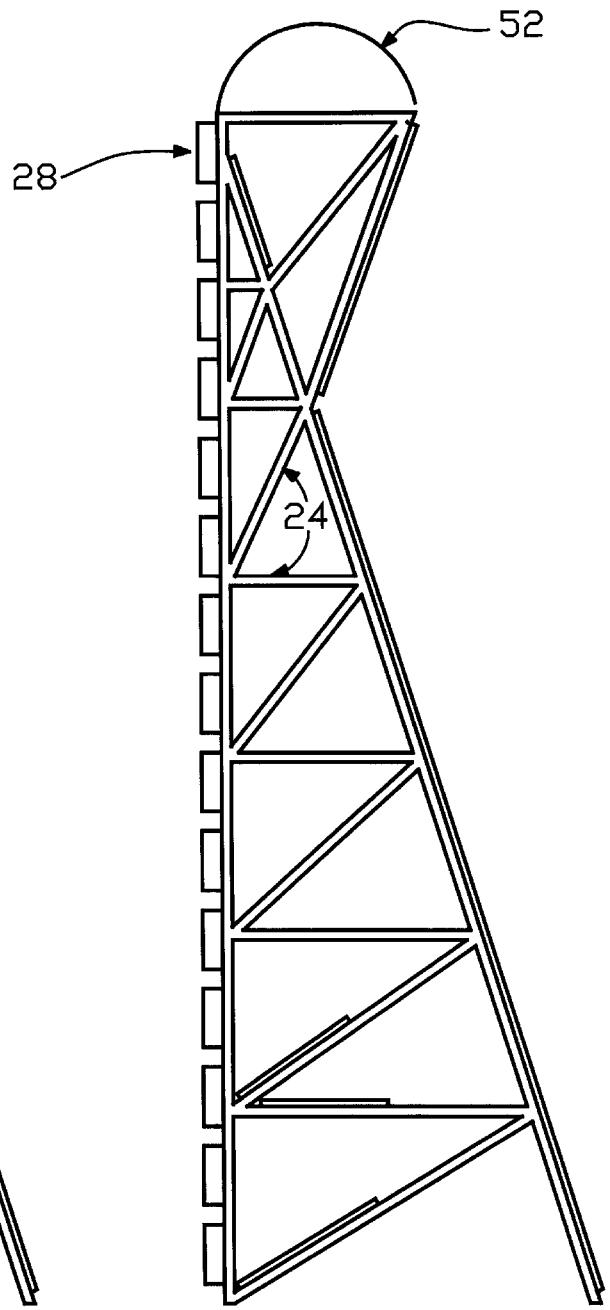
Figure 5                    Figure 6

6,016,888

STABLE FLOW ENHANCEMENTS FOR GROUND RUNUP ENCLOSURE

CROSS-REFERENCES TO RELATED APPLICATIONS

STATEMENTS AS TO RIGHTS TO INVENTIONS MADE UNDER FEDERALLY SPONSORED RESEARCH AND DEVELOPMENT

NONE

THE PRESENT INVENTION HAS BEEN DEVELOPED ENTIRELY WITH PRIVATE FUNDS.

BACKGROUND OF THE INVENTION

I. Field of the Invention

The present invention relates to Ground Runup Enclosures (GRE) which are used at airports to run jet engines up to full power or thrust in order to test the condition of the engines. The purpose of a GRE is to protect the airport and surrounding area from the force of the blast from the jet engines and from the great amount of noise created by the engines at full runup. The instant invention pertains to aerodynamic enhancements to a GRE which allow stable flow of air to the jet engine inlets under varying wind velocities and directions.

II. Description of Related Art

For more than 30 years, airports, airlines, and maintenance companies have been faced with the problem of trying to mitigate the noise generated during engine ground runups. In the 1960's the most popular technology involved large "mufflers". This approach involved permanently fixed mufflers or detuners. To utilize this type of facility, a tow motor would be attached to an aircraft, and it would be pushed back adjacent to the detuners, so that the jet nozzle would be immediately adjacent to, or slightly inside of the detuner. There were several significant disadvantages to this arrangement: First, the detuners were aircraft specific thus requiring an airline such as British Airways to have many sets, each for a different type of aircraft. Second, there are great operational risks, difficulties and liabilities associated with positioning a multi-million dollar aircraft next to a fixed piece of ramp equipment. It is also very time consuming. Finally, the aircraft can only utilize these fixed detuners for full takeoff power runs if the wind is within certain limits, generally about 30 degrees of the nose. U.S. Pat. No. 3,386,528 describes such an invention in which the jet engines are plugged into curved tubular deflectors which direct the jet blast and sound upward into the atmosphere.

In the early 1980's, a German firm developed a new type of noise protection facility. The German firm manufactures industrial noise panels generally for use in industry. In about 1982, they applied this technology to aircraft by building an engine ground runup facility comprising a four (4) sided enclosure whose end and walls support a matrix of rectangular boxes. The boxes which are made of metal or concrete have openings in the front to admit sound waves. The boxes contain sound absorptive material to deaden the sound. The walls of these units have generally been of quite heavy construction, the walls being constructed of structural materials such as concrete. The front of the facility was comprised of doors which moved on rails. Initially, these facilities were used primarily for low bypass engines as used on older aircraft. These engines are far more tolerant of irregular winds than are the high bypass engines used first on the B-747. The German firm has built about 6 or 7 of these facilities. As these facilities came to be used with high bypass engines, users generally found that their usability was greatly diminished, because whenever the wind was strong and not coming directly into the enclosure, the high walls would create turbulence which could induce surging and create a compressor stall in the high bypass engine. This has become a common problem for all GRE's with solid side walls.

That same German firm has tried several facilities with vertical louvers in the side and front walls, but these louvers, too, have proven to be unsuccessful in solving the problems of turbulence within the facility.

Another primary problem with the GRE designed by the German firm is with recirculation of the air through the engine inlet. They use a screen type diffuser instead of a true blast deflector within their facility. This expanded metal screen slows down the blast, while assisting acoustically, but the mass of air moving more slowly after being diffused, is prone to be blown back towards the engine inlet during side and quartering rear wind conditions. If the same exhaust air is recirculated, it can cause surging or stalling, as the oxygen of the mass has previously been burned by the engine.

SUMMARY OF THE INVENTION

The general purpose of the present invention in its preferred embodiment, which will be described subsequently in greater detail, is to provide a package of aerodynamic improvements to a two, three, or four sided ground runup enclosure, while providing ease of access. The aerodynamic improvements work cooperatively to make the facility usable under a wide diversity of wind conditions, while improving safety and sound reduction.

In its preferred embodiment, the present invention is incorporated into a three-sided GRE that is comprised of 40 foot high walls of sufficient length to allow narrow bodied jet airplanes such as the Boeing 727, 737, 757, and DC-9 to taxi into the GRE, turn 180° and position themselves under their own power, and for larger bodied jet airplanes such as the Boeing 747, 767, and 777 to be placed in position for ground runup testing by a tug.

A three-sided enclosure can meet the acoustical performance standards desired of a GRE because the aircraft noise level is lower to the front of the aircraft. The GRE is placed on an airport parking ramp, near enough to maintenance areas for easy access by aircraft.

The GRE of this embodiment includes a jet blast deflector spaced forward of the 40 foot rear wall. The blast deflector of this embodiment is a solid, curved, continuous apparatus that intercepts the jet blast at ground level, redirects the blast 90° from a horizontal to a vertical upward heading. The function of the blast deflector is to remove the force and effect of the blast from the GRE and surrounding areas. The placement of the blast deflector allows the surrounding noise atteruating walls to be constructed of lighter weight materials than in prior art enclosures, because they are not subjected to the great loads created by the blast. The function of the noise attenuating walls and the components thereof is to suppress the sound emitted by the jet engines at full thrust.

All problems are not solved simply by the blast deflector and the sound absorbent walls. Provisions must be made for winds which cause major problems. The fact is, most GRE's simply don't perform well in quartering or cross wind conditions. This is critical because turbulence at the engine's inlet can cause dangerous surges, stalls and recirculation, and regardless of the quality or amount of noise reduction, airlines and airports must first and foremost feel confident that their aircraft and crews will be safe. Since these jet aircraft are designed to operate in the flight mode, they are limited in the amount of crosswind and turbulence that can be tolerated during ground runup operations. The engine operates best when the air flow at the fan surface is steady and uniform.

The amount of crosswinds and air flow distortion limits the overall engine stability. This effect becomes more noticeable as the engine power is increased. High crosswinds create a high pressure differential in the engine inlet which leads to surging and can lead to a compressor stall so as to cause engine stalling. Ground runups of aircraft are usually made with the aircraft facing into any existing wind in order to minimize these effects. Most aircraft are limited to about a 5–10 knot crosswind during high power ground runup operations.

The GRE is oriented such that the open end faces the prevailing wind. Jet aircraft must be faced into the wind during ground runup operations in an attempt to eliminate the dangerous problem of surging, stalling, and hot exhaust gas recirculation back into the engine inlet.

The wind and recirculation problems of the GRE present aerodynamic considerations which must be addressed. Since the GRE cannot be rotated so the aircraft faces directly into the wind for aircraft operations, the effective crosswind at the engine inlet must be reduced without creating excessive air flow turbulence. Also in a quartering head wind, the forward end of the GRE side wall may generate a vortex street. Any such vortex street can be detrimental to engine operations, expecially if the vortex enters the engine inlet.

The solution presented herein to the foregoing problems involves the use of a solid continuous, curved, corrugated blast deflector, and the development of a package of aerodynamic enhancements which make the facility usable under a wide diversity of wind conditions. The blast deflector of this invention will include spaced, horizontal openings or slots to equalize pressures fore and aft of the fence and to allow transmittal of sound waves through the fence.

First, the solid corrugated curved, continous blast deflector maintains the energy of the blast envelope which is turned upwards. This mass of air is still moving at a relatively high velocity, and thus is far less susceptible to quartering and side wind conditions.

The aerodynamic enhancements or means for stabilizing entry air that in addition to the solid blast deflector allow the GRE to be effectively used in a variety of wind conditions, are the rolled top, sloped entry lip, and vented side walls. It is expected that wind conditions within a GRE during runup by the employment of the vented side walls alone will be significantly improved, or if the sloped front and rolled top is not used in combination with the other aerodynamic enhancements, significant improvement would also be expected. Taken as a package, these three enhancements make the facility useable under most wind conditions. A brief description of each and the particular wind conditions it addresses follows.

First, the rolled top or rolled top means significantly improves the GRE's performance during rear quartering and side wind conditions. In rear quartering conditions, it facilitates a smooth flow of air into the facility over the top of the windward wall. This air can pass smoothly forward to the inlet. During side wind conditions, the rolled top or rolled top means allows air to pass smoothly over the top of the walls as well. In this case, the air which has a downward component from the top of the wall (towards the inlet) combines with the air allowed into the GRE through the side vents which has a slight upward component in a wide mixing zone. The air pressure is equalized and thus can be smoothly ingested into the inlet with no great pressure differential.

The second and most important element to the enhancement package is the vented side wall or vented side wall means. The gaps or vents are carefully proportioned to allow the right amount of unburned or unused air in for mixing with the air coming over the top of the wall. The key, however, is that although air is allowed to pass into the facility, the noise is not allowed to escape because the vents are lined with the same sound absorption panels that are used to create the sound absorption walls. The acoustic performance of the side walls does not deteriorate due to the vents. Unlike the louvers previously used by the German firm which covered only about 16 feet, these vents provide a wide mixing zone spread across much of the sidewall, up to 180 feet.

The third and final element is the sloped entry lip or sloped entry lip means, which, when used in conjunction with the rolled top (thus forming a rolled, sloped entry lip) eliminates dangerous turbulence during quartering head and side wind conditions. Previously, all GRE's had high squared off corners. During side and quartering head wind conditions, these corners would lead to a pressure differential as the side winds swept over the exterior of the walls, and was pulled toward the inlet. This high pressure on the windward side, when combined with the low pressure on the leeward side, creates turbulence which is swiftly sucked into the engine inlet, resulting in surging and the potential for compressor stall.

The rolled sloped entry lip allows air to pass smoothly into the facility. This air becomes attached to the side walls, and is pulled evenly towards the inlet. Even during true sidelined conditions, the overall performance of the GRE is enhanced because the induced flow pulled down and rearward by the rolled sloped entry lip induces additional airflow from front to rear of the facility. The GRE of the present invention channels all of the air smoothly from the entry lip of the facility to the engine inlet, through the nozzle, and out of the facility with a minimum of disturbance/turbulence.

To test the concepts presented by the present invention prior to use a 1:100 scale model of the proposed GRE was developed. Aircraft simulated were the 727-200 No. 2 engine, the 757 No. 2 engine, and the 767 No. 2 engine. Fuselage, wing, and tail surfaces of each aircraft were also modeled. The aircraft were placed in their proposed locations within the facility. A blower provided scale take off velocities for each aircraft. An axial flow fan with an expansion outlet and perforated diffuser section was used to simulate wind across the GRE at various angles. Tests were performed in wind conditions up to 20 knots.

Various entrance and side wall configurations were modeled to determine if they were able to improve performance in side and tail wind conditions. The jet blast deflector and rear wall were held constant. Among the walls that were tested were a 40 foot high solid wall with inwardly cantilevered upper section (FIG. 2) (which is common in existing GRE's), a 40 foot high undeviated solid wall, and a 40 foot high solid wall with a rolled inlet lip, a 40 foot high vented, undeviated wall, and a 40 foot high vented wall with a rolled inlet lip.

Testing with the model indicated that the combination of wall vents extended back beyond the engine inlets, rolled lip and sloped entrance demonstrated the greatest improvement in air flow within the GRE. Testing indicated that the aerodynamic improvements of the present invention will reduce vortices and turbulence within the GRE during cross wind conditions. Testing confirmed that cross wind velocities through the vented side walls were as predicted by aerodynamic analysis to be 4 miles per hour in velocity.

A full size GRE incorporating all of the aerodynamic improvements of this invention has been tested with a Boeing 757 jet airplane installed for ground runup testing. The 757 was run with both engines at take off power, and with the wind gusting at 18 knots, 45 degrees off the nose of the 757. The runup was completed with no surging, stalls, or recirculation.

Since the primary function of a GRE is noise reduction, the ability of the GRE to suppress the sound of the 757 under full takeoff was also measured. A maximum reduction of 23 decibels was actually measured.

There has thus been outlined rather broadly the important features of the present invention in order that the detailed description thereof that follows may be better understood, and in order that the present contributions may be better appreciated. There are of course additional features of the invention that will be described hereafter plus other embodiments all of which will form the subject matter of the claims appended hereto. Those skilled in the art will appreciate that the concept, upon which this disclosure is based may readily be utilized as basis, for carrying out the several purposes of the present invention. It is important, therefore that the claims be regarded as including such equivalent construction so far as they do not depart from the spirit and scope of the present invention.

As such it is an object of the present invention to provide improvements in a GRE that provide stable flow of unrecirculated air to a jet airplane during runup at full power while maintaining or improving maximum sound absorption.

It is another object of the present invention to provide a new and improved Ground Runup Enclosure which may be efficiently and easily manufactured, marketed, and installed, and the components of which are modular, nestable, easily packaged, and easily transportable.

It is a further object of the present invention to present a GRE which is safe for operation of all modern day jet aircraft at full power settings during ground runup.

It is a still further object of the present invention to provide a new and improved GRE for sound reduction at airports during engine runup which provides all of the advantages of all existing GRE's with none of the disadvantages of such prior GRE's.

An even further object of the present invention is to present a new and improved GRE which is considerably lower in overall cost than existing GRE's and solves the problems of existing GRE's that is the inability to operate in adverse wind conditions.

These together with other objects of the invention along with the various features of novelty which characterize the invention, are pointed out with particularity in the claims annexed to and forming a part of this disclosure. For a better understanding of the invention, its operative advantages and the specific objects attained by its uses, reference should be had to the accompanying drawings, and descriptive matters in which there is illustrated preferred embodiments of the invention.

E. BRIEF DESCRIPTION OF THE DRAWINGS

FIG. 1. A perspective drawing of the Ground Runup Enclosure (GRE) of the present invention displaying the aerodynamic enhancements of the present invention that contribute to stable air flow.

FIG. 2. A typical vertical wall of a prior art GRE with the upward portion cantilevered inwardly.

FIG. 3. Sectional view of the vented portion of the side wall with lines of force drawn to indicate air flow through and over the wall.

FIG. 4. Side sectional elevation of the GRE with the blast deflector, horizontal vents, sloped front and rolled top of the side wall.

FIG. 5. Side sectional elevation of the rear wall of the GRE and rear portion of side walls beyond the rolled top.

FIG. 6. Side sectional elevation of the side wall beyond the horizontal vents displaying rolled top.

FIG. 7. A perspective view of a section of the rolled top formed of corrugated sheet metal.

FIG. 8. A side sectional elevation of the sound absorbent panel from the sound absorbent walls of the GRE.

FIG. 9. A perspective drawing of a sound absorbent perforated sheet metal cover of the sound absorbent panel of FIG. 8.

DESCRIPTION OF THE PREFERRED EMBODIMENT

Figure 1:
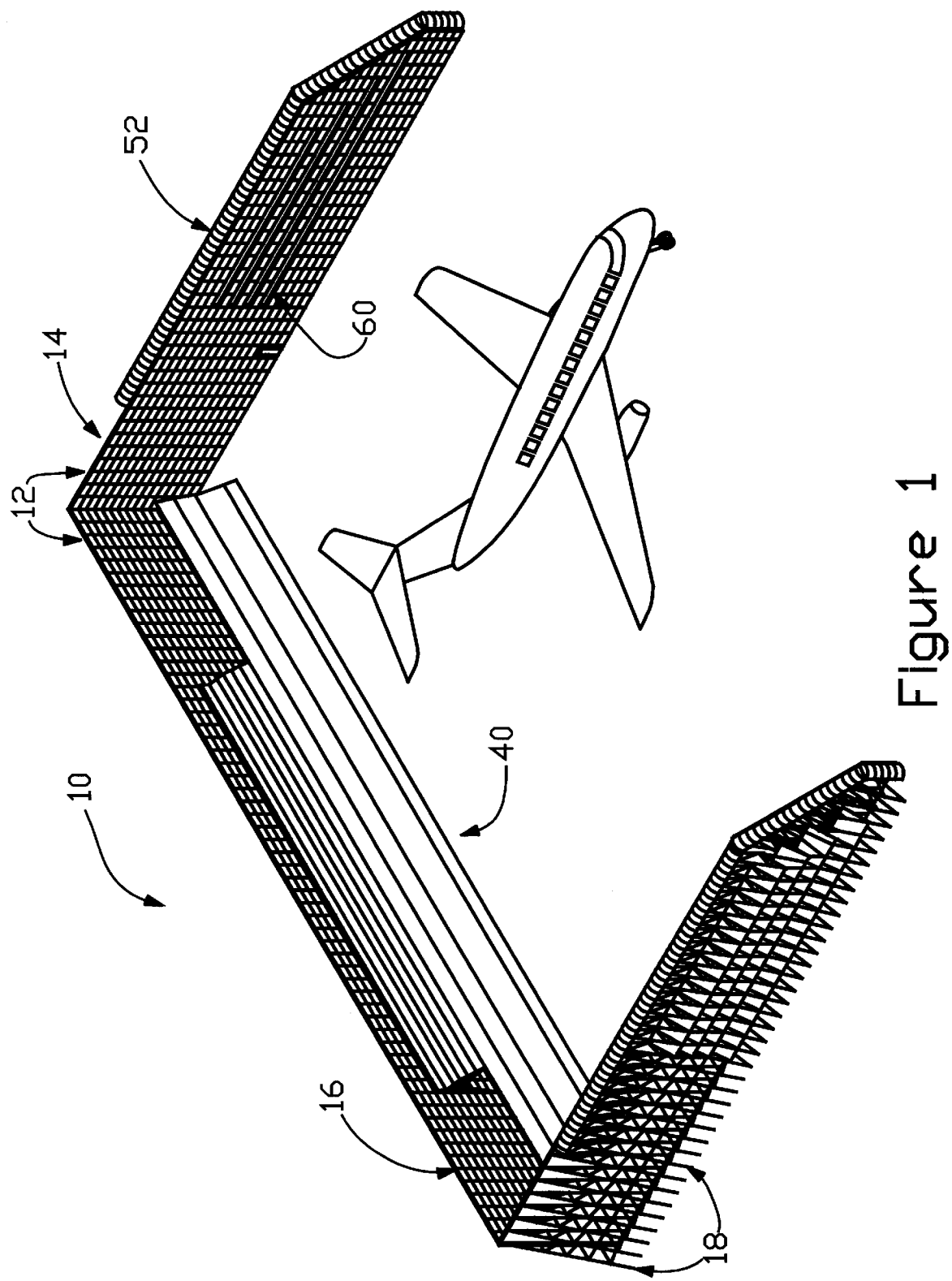

The present invention presents a solution which allows a Ground Runup Enclosure (GRE) to be used in windy or calm air conditions which will be experienced at airports around the country where the GRE of the present invention is expected to be used. The GRE of the present invention which is shown in FIG. 1, is comprised of three (3) sides, however, it is expected that the improvements discussed herein would also be applicable in a four-sided GRE to allow engine runup in calm and windy or turbulent air conditions. It is expected that the improvements described herein would be applicable to most, if not all, current GRE's.

The preferred embodiment of the instant invention as broadly depicted in FIG. 1 wherein is displayed a 3-sided GRE 10. The GRE 10 installed normally on an existing concrete hold pad or an apron close to the maintenance facilities at an airport. The GRE is installed with sufficient access space that narrow bodied jets such as the Boeing 727 and 737 will be able to enter the GRE, and manuever under their own power through a 180° arc into position for testing.

The wall or sides 12 of the GRE in the preferred embodiment are forty-foot in height. The side walls 14 basically form right angles with the rear wall 16.

The standard wall construction that is used with the GRE consists of a support structure (see FIG. 1) installed upon concrete leveling curbs constructed over the existing pavement. The curbs will raise the height of the walls by 18 to 24 inches and provide protection to the noise wall panels and structure. The support structure is comprised of spaced structural members which are anchored by means of Hilti anchors and bolts to the concrete curbs (see FIGS. 1, 5).

The support structure for the closed end of the GRE and for the sides without the rolled top are comprised of the spaced steel frames 18 as shown in FIGS. 1 and 5. These frames consist of an upstanding steel stanchion 20 supported by a truss comprised of a diagonally disposed steel beam 22 that is bolted at its base to the curb by means of a Hilti anchor and at its upper end to the upstanding beam 20. Cross beams 24, as shown, complete the structure of the truss.

Figure 8:
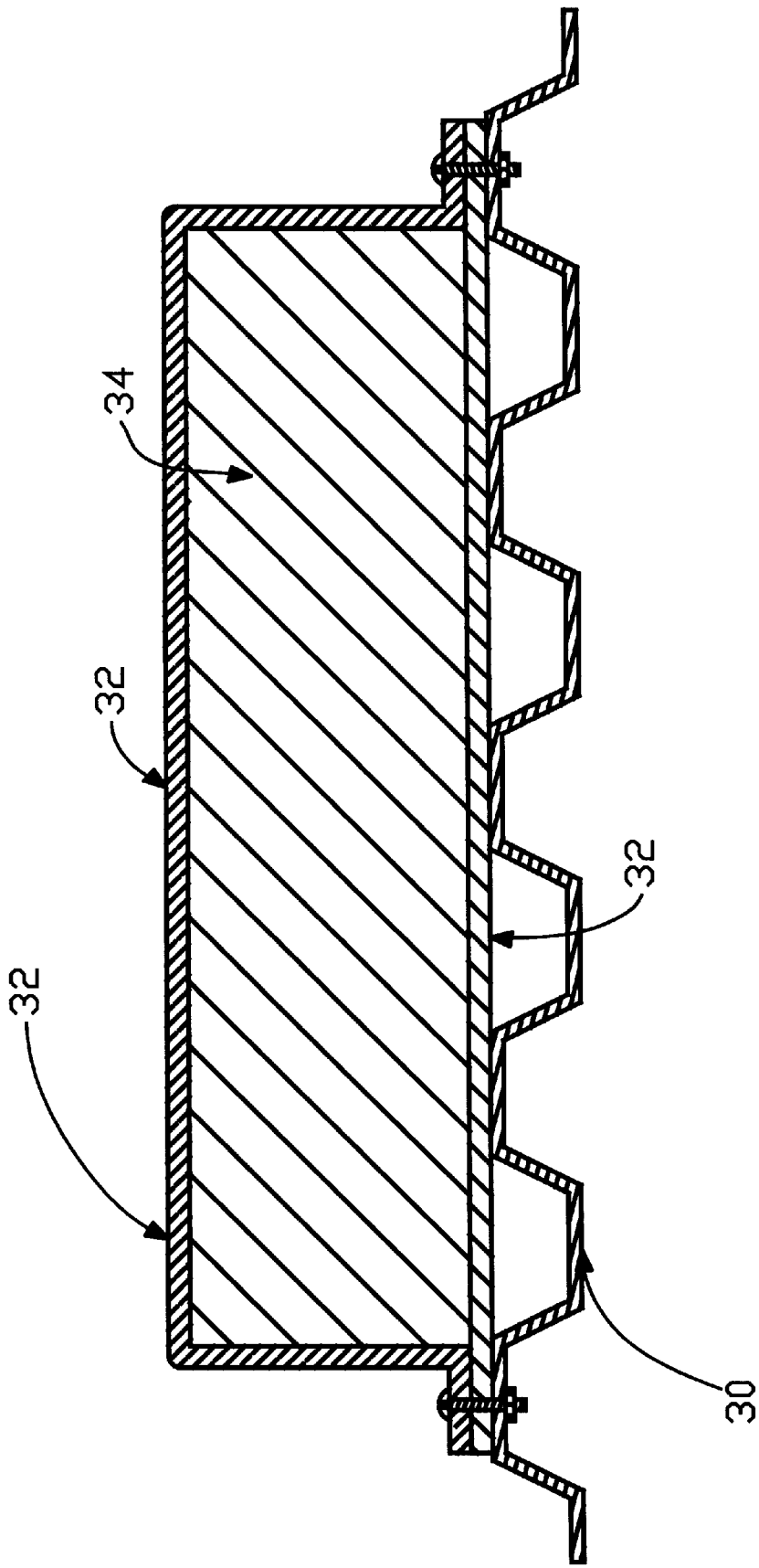
Figure 9:
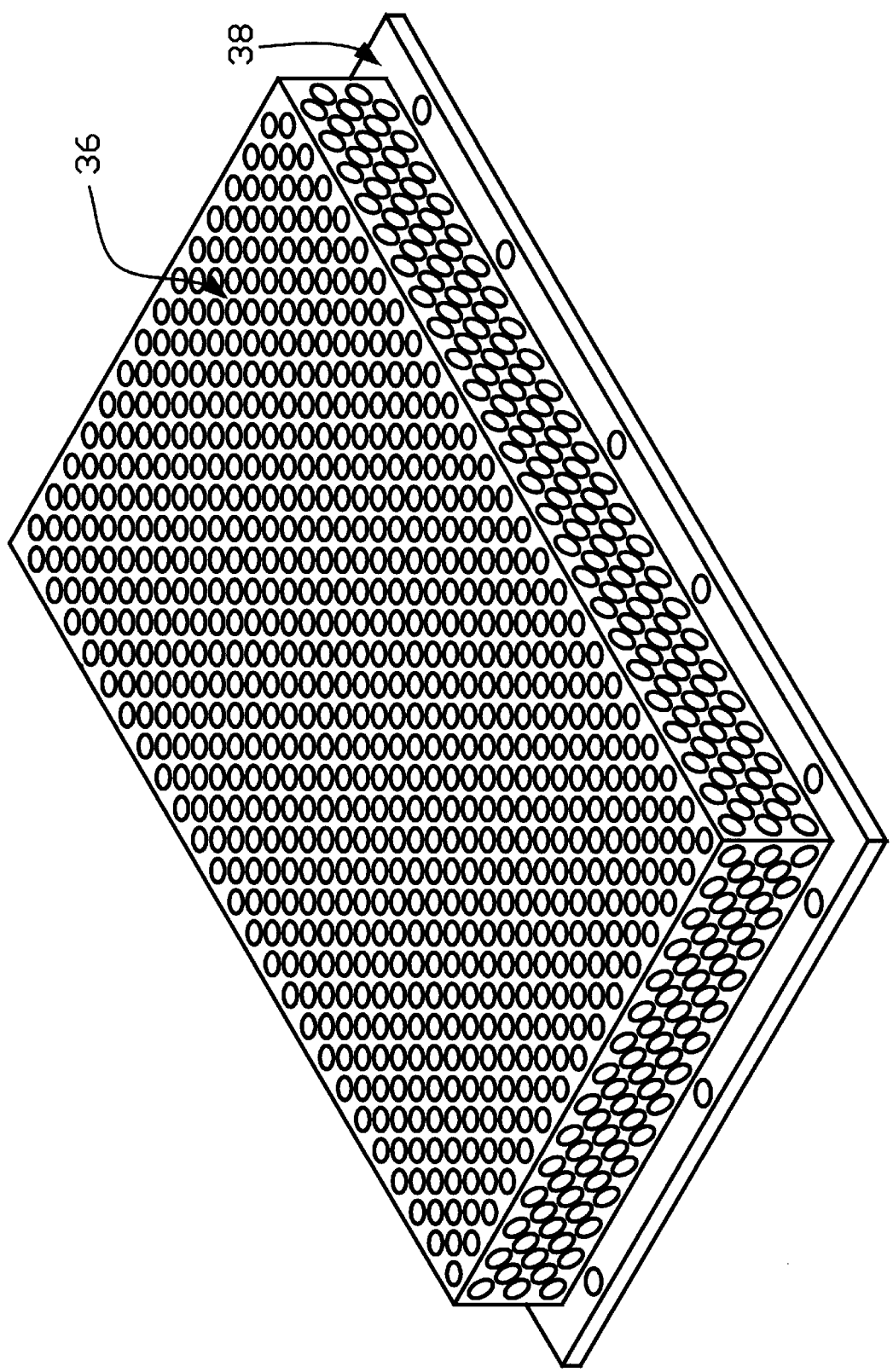

The sound suppression panel 28 of this Embodiment is comprised of a corrugated Mini-Vee support backing 30, a sound absorbent cushion that is comprised of a polypropylene cover 32 and a Fibreglas interior 34, and a box cage or shield 36 of perforated sheet metal which encompases the cushion. The corrugated Mini-Vee beam (see FIGS. 8 and 9) support backing 30 is bolted in 32 by 146 inch sheets to the upstanding beams of the support structure. The Mini-Vee beam 30 provides structural rigidity to the walls with a limited amount of material and weight. In addition, the backing 30 provides a reflector for sound waves that travel through the sound suppression cushion. The sound flows through the polypropylene covering 32, and is absorbed in the Fibreglas 34. The sound that travels through the cushion is reflected back into the cushion by the corrugated metal.

The shield 36 is a rectangular box-like structure with an open face and a flange 38 about the circumference of the box. On assembly the cage or shield 36 is bolted, or by other means secured, through the mutual, flanges of the cage and cushion. The sound absorption cushions of this embodiment will be constructed with 2 foot by 6 foot by 7½ inch height dimensions for optimal sound absorption. The cushions with their corresponding cages or covers will be arrayed with six inch spacing vertically and horizontally from the other cages on the Mini-Vee beam support backing. The combination will be secured in turn to the Mini-Vee beam backing by bolts that are threaded through holes in the flanges and holes in the Mini-Vee beam backing.

FIG. 6 displays a sectionalized view of the side wall having the rolled top but no vents. The structure of the wall is equivalent to the wall of FIG. 5, but with the addition of the rolled top 52.

In operation, sound from the jet exhaust travels through the face and sides of each of the perforated metal cages 36 into and through the polypropylene cover 32 and into the Fibreglas cushion 34. The Fibreglas 34 absorbs the bulk of the sound on this first pass and sound that is not absorbed is reflected back into the Fibreglas 34 by the Mini-Vee beam backing 30.

Spaced forward of the rear sound absorbent wall is a blast deflector fence 40 (FIG. 1 and 4) which deflects the blast of the jet engines from a horizontal to a 'near' vertical heading. The blast deflector fence 40 of the present embodiment is comprised of a structural steel skelton comprised of a series of spaced support frames which are bolted to the apron and overlaid by sheets of corrugated sheet metal bolted to the frames. The sheet steel surface of the deflector provides a solid, continuous surface that intercepts the jet blast at ground level and guides the blast through a 60 to 70 degree change of direction. The blast deflector of this embodiment includes spaced horizontal openings or slots to equalize pressure fore and aft and to allow transmittal of sound through the deflector fence.

Figure 2:
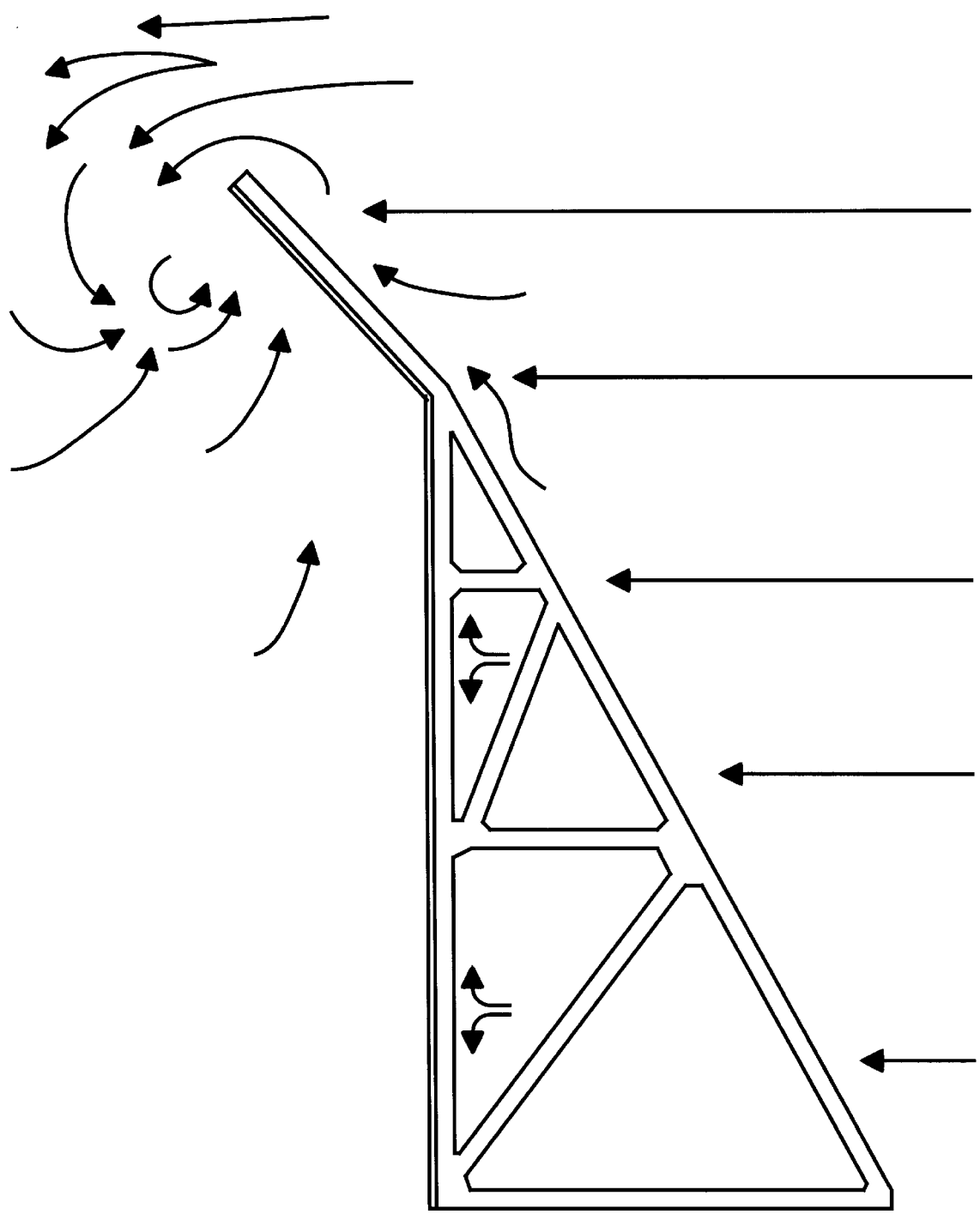

FIG. 2 displays a cutaway end view of a wall that has been quite common with existing GRE's. In an effort to contain the sound, the upper portion of the wall has been constructed with an inwardly cantilevered section. The arrows in FIG. 2 indicate that the inwardly cantilevered walls create turbulence within the GRE with any wind conditions. Even with high vertical walls, turbulence will be created when the winds are strong.

In the ideal case, the aircraft would face directly into the wind during ground runup operations to reduce or eliminate hot exhaust gases recirculating back into the engine inlet. Since the GRE cannot be rotated so the aircraft faces directly into the wind during runup, the effective crosswind at the engine inlet must be reduced without creating excessive airflow turbulence. Also in a quartering wind, the forward end of the GRE side wall may generate a vortex street. Any such vortex street can be detrimental to engine operations, especially if the vortex enters the engine inlet.

The combination of the rounded and sloped entry lip and vented side walls along with the solid continuous blast deflector as shown in FIG. 1 allows stable, unrecirculated unused air to enter the aircraft engine during testing in the GRE. Each of these improvements or enhancements will improve air stability and can be employed separately, but the greatest improvement in air stability will be gained with the combination of all three.

Figure 3:
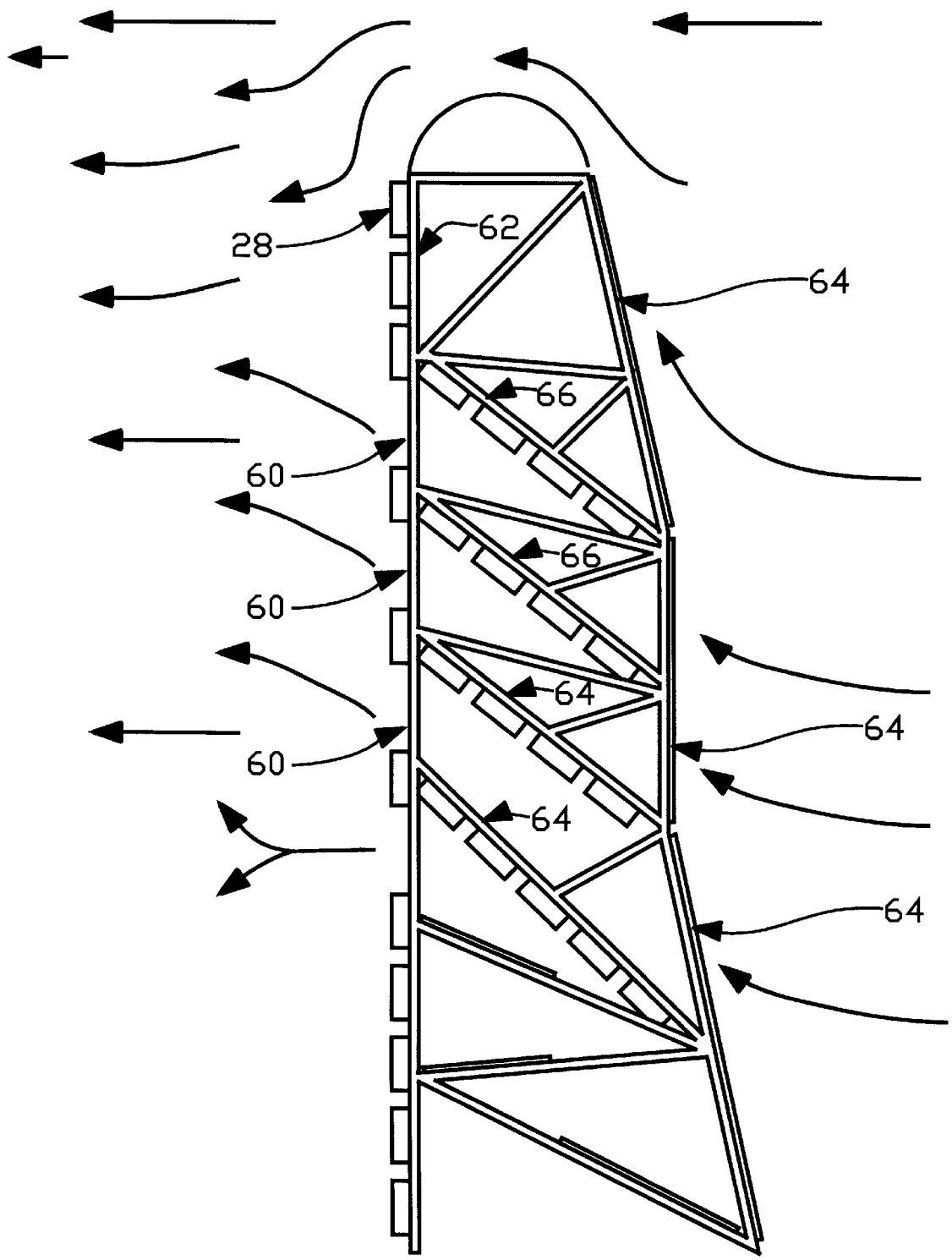
Figure 4:
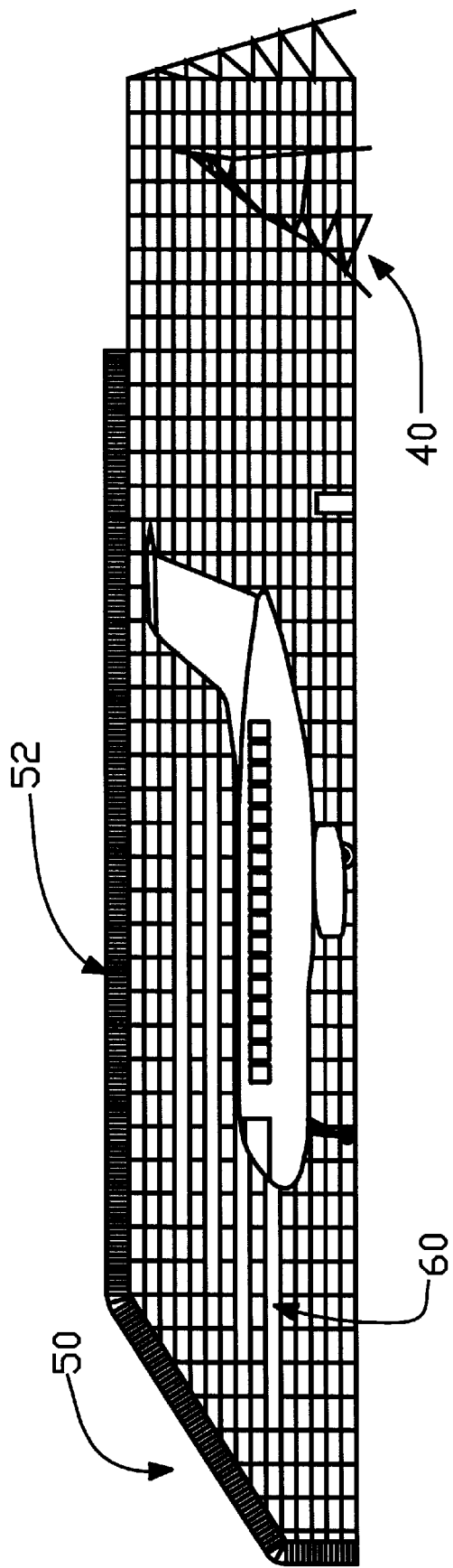

The forward portion 50 of each of the sidewalls 14 is sloped forward, forming a sloped entry lip, FIG. 1 and FIG. 4, to reduce the flow separation that causes the damaging vortex streets. This type of entry greatly improves stable air flow to the engine during quartering head winds. Further improvement is gained by the provision of a rounded bellmouth (FIGS. 1, 3, 4, and 7) type of entry 52 at the leading edge. As depicted in FIG. 1 and FIG. 4, the rounded bellmouth 52 extends from the initial beginning of the vertical wall at ground level, along the sloped portion 50, and thence along the top of the wall 14 to a point near the leading edge of the blast deflector.

Figure 7:
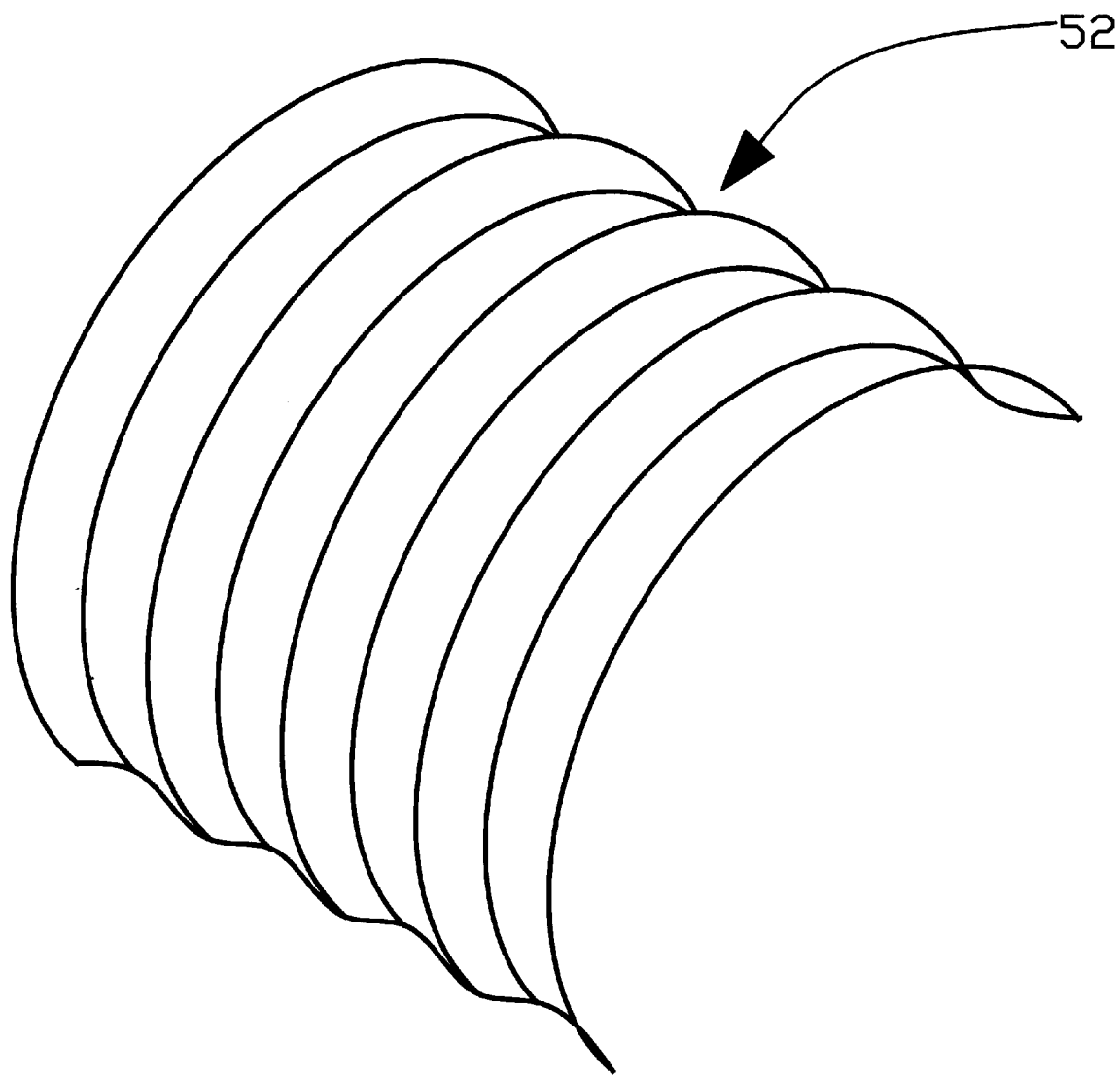

The rolled top or rounded bellmouth 52 type of entry is comprised of corrugated sheet steel that has been rolled to form a semi cylindrical structure (FIG. 7) that is attached at the top of the support structure FIG. 3 to form a continuous rounded corrugated surface (FIGS. 1 and 7). The rounded bellmouth 52 in combination with the sloped forward sections 50 of the side walls further reduces the flow separation that causes the damaging vortex streets.

The side walls of the present invention are vented to reduce the crosswind that is experienced at the engine inlet. As shown in FIGS. 1, 3, and 4, a series of parallel spaced, horizontal vents 60 extend from the sloped entry 50 more than one-half the length of the wall so that the walls are vented beyond the intakes of each of the engines of aircraft during ground runup. FIG. 3 is a sectionalized view of the wall which displays the vents. The sound absorbent wall (FIG. 3) is comprised of a support structure which is composed of a series of spaced upstanding stanchions 62 or beams which are bolted to the curb by means of Hilti anchors. Overlaying the stanchions, as with the rear wall is corrugated sheet metal or Mini-Vee beam. Four (4) horizontal vents 60 shown in FIG. 1 and FIG. 4, are spaced vertically in the wall. The vents 60 are formed in the supporting truss of the sound absorbing wall. The supporting truss is comprised of a rear strut 64 that consists of three (3) sections as disclosed in FIG. 3. The air passages or channels to the vents are formed by the parallel, diagonally disposed cross braces 66. Corrugated sheet metal or Mini-Vee beam is bolted in sheets to the cross braces of each succeeding frame to form a solid surface for the passages. Sound absorbent panels 28 as herein-above described comprised of perforated sheet steel boxes containing sound absorbent cushions as previously described hereinabove are bolted to each of the surfaces as shown in FIG. 3. The boxes are spaced and arrayed in the same fashion as previously explained.

During engine runup in windy conditions, wind flows over the rolled tops 50 of the walls 14 and through the vents 60 in the walls 14. The upward force of the airflow through the vents 60 counteracts the downward force of the airflow over the rolled lip 50 results in a reduced velocity of air moving to the engine inlets. The net result has been shown to be a 4 MPH cross flow inside the GRE in a 15 MPH cross wind.

As stated previously, each of the aerodynamic enhancements described can be used individually to reduce turbulence inside the GRE but the greatest reduction in turbulence is expected through the employment of the sloped entry, horizontal side wall vents, and rolled top, in addition to the use of a solid continuous surface blast deflector.

While the invention has been described with reference to the specific embodiment described, those descriptions are only illustrative and are not to be construed as limiting the invention. With respect to the above descriptions, then, it is to be realized that the optimal dimensional relationships for the parts of the invention include variations in size, materials, shape, configurations, form, function, and manner of operation assembly and use, are deemed readily apparent and obvious to those skilled in the art and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to falling within the scope of the invention.

What is claimed as being new and desired to be protected by Letters Patent of the United States is as follows:

What is claimed is:

1. A ground runup enclosure for testing the engines of jet aircraft at full power while reducing the noise produced, comprising:
   a) a three wall enclosure including two side walls and a rear wall;
   b) spaced sound absorbent panels arrayed over the interior of each wall;
   c) a blast deflector spaced forward of the rear wall for deflection of jet exhaust gases;
   d) aerodynamic means including horizontal vents in the two side walls, and rolled top on the side walls by which unburned air coming through the vents and over the top meets to reduce turbulence and to stabilize air drawn into the jet engines.

2. A ground runup enclosure for testing the engines of jet aircraft at full power while reducing the noise produced, comprising:
   a) a three wall enclosure including two side walls and a rear wall;
   b) spaced, sound absorbent panels arrayed over the interior of each wall;
   c) a blast deflector spaced forward of the rear wall for deflection of jet exhaust gases;
   d) aerodynamic means included in the two side walls for reduction of turbulence and stabilization of air drawn into the jet engines, the aerodynamic means comprising:
      sloped leading edges of each side wall;
      horizontal spaced vents in each sidewall; and the top of each side wall having a semicylindrical shape extending from inception of each side wall.

3. The invention of claim 2 wherein the upward force of air pulled into the Ground Runup Enclosure through the horizontal spaced vents is counteracted by the downward force of the air that flows over the semicylindrical top into the Ground Runup Enclosure to produce stable flow at engine inlets.

4. The invention of claim 2 wherein sound absorbent panels are incorporated into the vents to reduce noise therethrough.

5. The invention of claim 2 wherein the horizontal spaced vents extend from the sloped entry to a point beyond the engine inlets.

6. In a ground runup facility having two or more walls that is used to reduce the noise from jet aircraft during engine testing, the invention comprising:
   a) a blast deflector spaced to the rear of the aircraft to deflect the jet blast;
   b) side walls for placement of the jet aircraft therebetween;
   c) spaced, sound absorbent panels arrayed over the surfaces of the side walls closest to the aircraft for attenuation of sound emanating from the engines during testing;
   d) spaced, parallel, horizontal vents in the side walls for movement of unused air into the facility;
   e) rounded top of each side wall, such that air moves into the facility over the rounded top and through the vents, the air moving downward from the rounded top meets the air moving upward from the vents to produce stable air flow for the engines.

* * * * *